US012707502B2

(12) United States Patent
Tomala et al.

(10) Patent No.: US 12,707,502 B2
(45) Date of Patent: Aug. 11, 2026

(54) PRIORITIZING RANDOM ACCESS PROCEDURES FOR MOBILE TERMINATED ACCESS ATTEMPTS IN PAGING MESSAGE

(71) Applicant: Nokia Technologies Oy, Espoo (FI)

(72) Inventors: Malgorzata Tomala, Wroclaw (PL); Samuli Heikki Turtinen, Ii (FI); Gyorgy Tamas Wolfner, Budapest (HU)

(73) Assignee: Nokia Technologies Oy, Espoo (FI)

( * ) Notice: Subject to any disclaimer, the term of this patent is extended or adjusted under 35 U.S.C. 154(b) by 589 days.

(21) Appl. No.: 18/033,467

(22) PCT Filed: Oct. 23, 2020

(86) PCT No.: PCT/EP2020/079937
§ 371 (c)(1),
(2) Date: Apr. 24, 2023

(87) PCT Pub. No.: WO2022/083879
PCT Pub. Date: Apr. 28, 2022

(65) Prior Publication Data
US 2023/0403745 A1 Dec. 14, 2023

(51) Int. Cl.
*H04W 74/0833* (2024.01)
*H04W 68/02* (2009.01)
*H04L 5/00* (2006.01)
*H04W 74/0836* (2024.01)
*H04W 74/0838* (2024.01)

(52) U.S. Cl.
CPC ....... *H04W 74/0833* (2013.01); *H04W 68/02* (2013.01); *H04L 5/0048* (2013.01); *H04L 5/0053* (2013.01); *H04W 74/0836* (2024.01); *H04W 74/0838* (2024.01)

(58) Field of Classification Search
None
See application file for complete search history.

(56) References Cited

U.S. PATENT DOCUMENTS

2016/0249385 A1* 8/2016 Gage ..................... H04W 74/06
2019/0045481 A1* 2/2019 Sang ..................... H04B 1/713
2019/0268949 A1* 8/2019 Menon .................... H04L 27/26
2019/0306817 A1* 10/2019 Abedini .............. H04W 56/005
2020/0252967 A1 8/2020 Ozturk et al.
2020/0296771 A1 9/2020 Tang
2021/0385878 A1* 12/2021 del Carpio Vega .......................... H04W 74/0866

(Continued)

OTHER PUBLICATIONS

Nokia et al., "RACH prioritization for slices," 3GPP TSG-RAN WG2 Meeting #112, R2-2009422, Nov. 2-13, 2020, Elbonia.

(Continued)

*Primary Examiner* — Bob A Phunkulh
(74) *Attorney, Agent, or Firm* — Barta Jones, PLLC

(57) ABSTRACT

A UE receives, in a paging message, information corresponding to random-access priority. The UE applies, in response to a random access being triggered, the random-access priority according to the information received in the paging message. A network node in a wireless system generates information corresponding to random-access priority for a UE to use for a random-access procedure. The network node sends, in a paging message, information corresponding to the random-access priority toward the user equipment.

27 Claims, 4 Drawing Sheets

(56) References Cited

U.S. PATENT DOCUMENTS

2022/0030631 A1* 1/2022 Jung .................. H04W 74/002
2023/0232458 A1* 7/2023 Christoffersson ........................... H04W 74/0833 370/329

OTHER PUBLICATIONS

ZTE Corporation et al., "Consideration on the slice specific RACH configuration," 3GPP TSG-RAN WG2 Meeting #112, R2-2009806, Nov. 2-13, 2020.

* cited by examiner

PRIORITIZING RANDOM ACCESS PROCEDURES FOR MOBILE TERMINATED ACCESS ATTEMPTS IN PAGING MESSAGE

TECHNICAL FIELD

Exemplary embodiments herein relate generally to wireless communications and, more specifically, relates to random access procedures for user equipment to attempt to access wireless networks.

BACKGROUND

A wireless network has a certain amount of network resources available for use to support user equipment (UEs) access to and communication with the network. One relatively recent topic of exploration in this area has been to "slice" these resources into slices, where the slices can have different resources and be assigned for different reasons. The slices could be customer based, e.g., customers require guaranteed resources. The slices could be services based, e.g., different services require different quality of services.

The slices can, however, create issues when UEs perform random access procedures, which are performed for the UEs to access and connect to the network.

BRIEF SUMMARY

This section is intended to include examples and is not intended to be limiting.

In an exemplary embodiment, a method is disclosed that includes receiving, in a paging message by a user equipment, information corresponding to random-access priority. The method also includes, in response to a random access being triggered, applying by the user equipment the random-access priority according to the information received in the paging message.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, in a paging message by a user equipment, information corresponding to random-access priority; and in response to a random access being triggered, applying by the user equipment the random-access priority according to the information received in the paging message.

An exemplary computer program product includes a computer-readable storage medium bearing computer program code embodied therein for use with a computer. The computer program code includes: code for receiving, in a paging message by a user equipment, information corresponding to random-access priority; and code for in response to a random access being triggered, applying by the user equipment the random-access priority according to the information received in the paging message.

In another exemplary embodiment, an apparatus comprises means for performing: receiving, in a paging message by a user equipment, information corresponding to random-access priority; and in response to a random access being triggered, applying by the user equipment the random-access priority according to the information received in the paging message.

In an exemplary embodiment, a method is disclosed that includes generating, by a network node in a wireless network, information corresponding to random-access priority for a user equipment to use for a random-access procedure. The method further includes sending, in a paging message by the network node, information corresponding to the random-access priority toward the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: generating, by a network node in a wireless network, information corresponding to random-access priority for a user equipment to use for a random-access procedure; and sending, in a paging message by the network node, information corresponding to the random-access priority toward the user equipment.

An exemplary computer program product includes a computer-readable storage medium bearing computer program code embodied therein for use with a computer. The computer program code includes: code for generating, by a network node in a wireless network, information corresponding to random-access priority for a user equipment to use for a random-access procedure; and code for sending, in a paging message by the network node, information corresponding to the random-access priority toward the user equipment.

In another exemplary embodiment, an apparatus comprises means for performing: generating, by a network node in a wireless network, information corresponding to random-access priority for a user equipment to use for a random-access procedure; and sending, in a paging message by the network node, information corresponding to the random-access priority toward the user equipment.

BRIEF DESCRIPTION OF THE DRAWINGS

In the attached Drawing Figures:

Figure 9.2.6-1 in TS38.300) illustrate various RA procedures, where FIG. 2A illustrates a CBRA with 4-step RA type, FIG. 2B illustrates CBRA with 2-step RA type, FIG. 2C illustrates CFRA with 4-step RA type, and FIG. 2D illustrates CFRA with 2-step RA type;

DETAILED DESCRIPTION OF THE DRAWINGS

Figure 1:
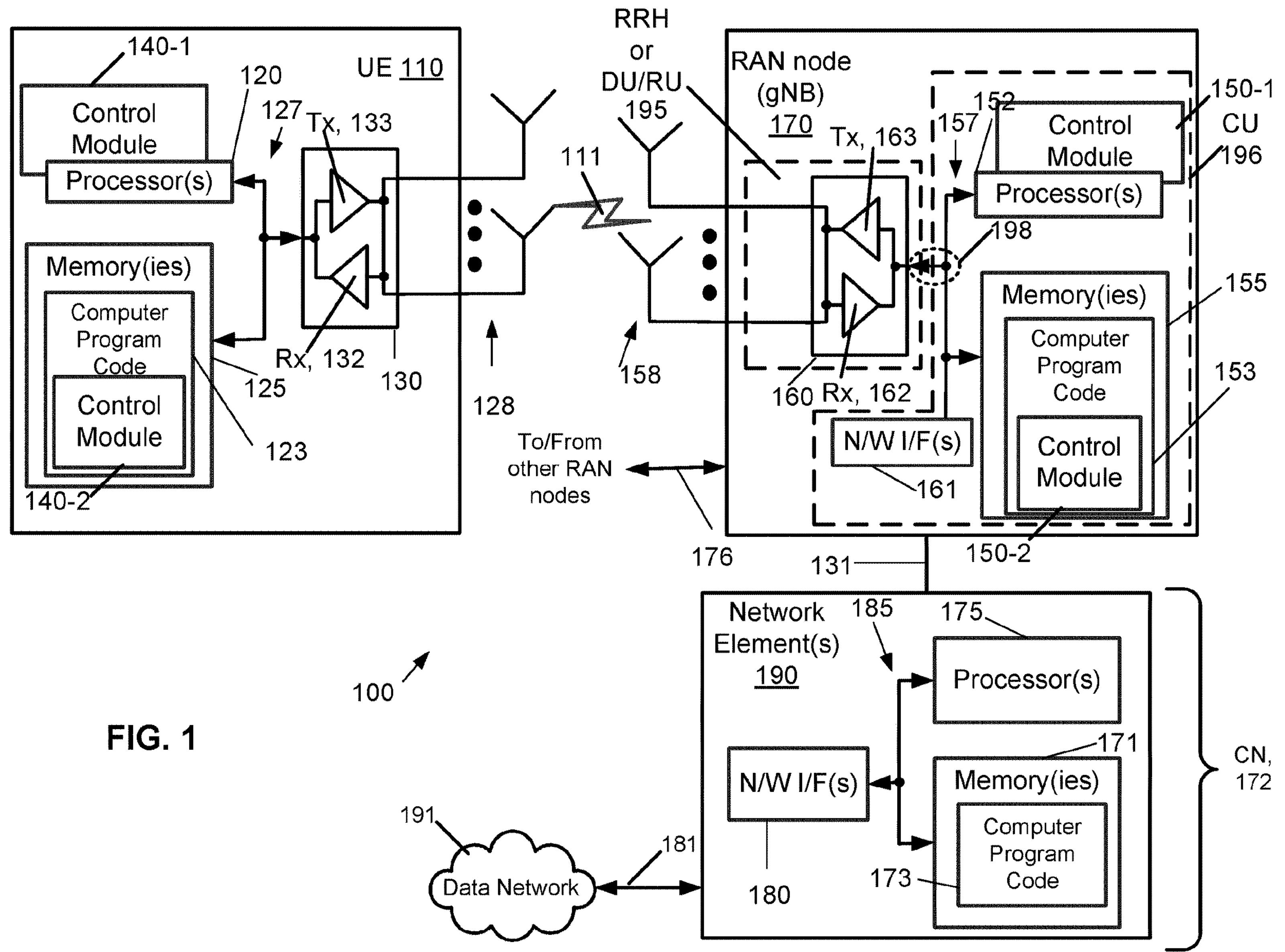
FIG. 1 is a block diagram of one possible and non-limiting exemplary system in which the exemplary embodiments may be practiced.

Abbreviations that may be found in the specification and/or the drawing figures are defined below, at the end of the detailed description section.

The word “exemplary” is used herein to mean “serving as an example, instance, or illustration.” Any embodiment described herein as “exemplary” is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for priority classes for random access procedures. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. In the examples given below, the RAN node 170 is assumed to be gNB 170, though this is merely exemplary. A gNB is a node providing NR user plane and control plane protocol terminations towards the UE, and connected via the NG interface to a 5GC or other Core Network (CN) 172 (e.g., the network element(s) 190).

In terms of the examples herein, and as an overview of part of what is described below, priority classes may be determined by the network 100, such as the gNB 170 (and/or other network element(s) 190). It is the network 100 that decides to allocate priorities for slices/access categories. That is, since the network provides (e.g., NR) user plane and control plane protocol terminations towards the UE, the network can decide to assign a (higher) priority for random access, e.g., only for the terminations associated with slicing/access categories. Any configuration that is designed for slices or access categories (e.g., assigned as values 32-63 in certain examples below) may be assigned higher priority compared to other access attempts. Additional details are provided below.

Returning to a description of possible examples of the RAN node 170, the ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). These network elements 190 may comprise part of a CN 172. Such core network functionality for 5G, for instance, may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As described above, network slicing is being used to slice network resources into different slices. Since Rel-15, NR supports Network Slicing. General requirements, as per TS 38.300 (see, e.g., 3GPP TS 38.300 V16.3.0 (2020-09)), state the following:

---

A network slice always consists of a RAN part and a CN part. The support of network slicing relies on the principle that traffic for different slices is handled by different PDU sessions. Network can realise the different network slices by scheduling and also by providing different L1/L2 configurations.
(. . .)
Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.
The following key principles apply for support of Network Slicing in NG-RAN:
RAN awareness of slices
- NG-RAN supports a differentiated handling of traffic for different network slices which have been pre-configured. How NG-RAN supports the slice enabling in terms of NG-RAN functions (i.e. the set of network functions that comprise each slice) is implementation dependent.

Selection of RAN part of the network slice
- NG-RAN supports the selection of the RAN part of the network slice, by NSSAI provided by the UE or the 5GC which unambiguously identifies one or more of the pre-configured network slices in the PLMN.

Resource management between slices
- NG-RAN supports policy enforcement between slices as per service level agreements. It should be possible for a single NG-RAN node to support multiple slices. The NG-RAN should be free to apply the best RRM policy for the SLA in place to each supported slice.

(. . .)
Resource isolation between slices
- The NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.

Access control
- By means of the unified access control (see clause 7.4), operator-defined access categories can be used to enable differentiated handling for different slices. NG-RAN may broadcast barring control information (i.e. a list of barring parameters associated with operator-defined access categories) to minimize the impact of congested slices.

Slice Availability
- Some slices may be available only in part of the network. The NG-RAN supported S-NSSAI(s) is configured by OAM. Awareness in the NG-RAN of the slices supported in the cells of its neighbours may be beneficial for inter-frequency mobility in connected mode. It is assumed that the slice availability does not change within the UE's registration area.
- The NG-RAN and the 5GC are responsible to handle a service request for a slice that may or may not be available in a given area. Admission or rejection of access to a slice may depend by factors such as support for the slice, availability of resources, support of the requested service by NG-RAN.

---

There is a Rel-17 Study Item in RP-193254 (see CMCC, Verizon, "Study on enhancement of RAN Slicing", RP-193254, 3GPP TSG-RAN meeting #86, Sitges, Barcelona, 9-12 Dec. 2019), which sets the objective to work out a solution that will enable UE fast access to the cell supporting intended slice:

---

1. Study mechanisms to enable UE fast access to the cell supporting the intended slice, including [RAN2]
   a. Slice based cell reselection under network control
   b. Slice based RACH configuration or access barring Note: whether the existing mechanism can meet this scenario or requirement can be studied.

Note: The use of RAN slicing in given cells shall not prevent from accessibility for Rel-15 and Rel-16 UEs.

---

To enable fast access to a cell, two access control mechanisms are considered: (1) access-barring control; or (2) random-access control.

Concerning access-barring control, specified since Rel-15, this supports broadcasting of barring control information per access category. TS 24.501 (see, e.g., 3GPP TS 24.501 V17.0.0 (2020-09)) specifies how each UE's access attempt is categorized in a Non-Access Stratum (NAS) layer. There are 32 access category values that are reserved for operator use and can be associated with a slice identifier (e.g., S-NSSAI), see TS 24.501, subclause 4.5.3. Based on the operator-defined set of access categories, the UE can determine whether an access attempt for a given slice is authorized based on the broadcasted barring information, since a slice, for which access attempt is issued, corresponds to an access category. Once the barring check succeeds, the UE initiates a random-access procedure.

Figures 2A, 2B, 2C, 2D:
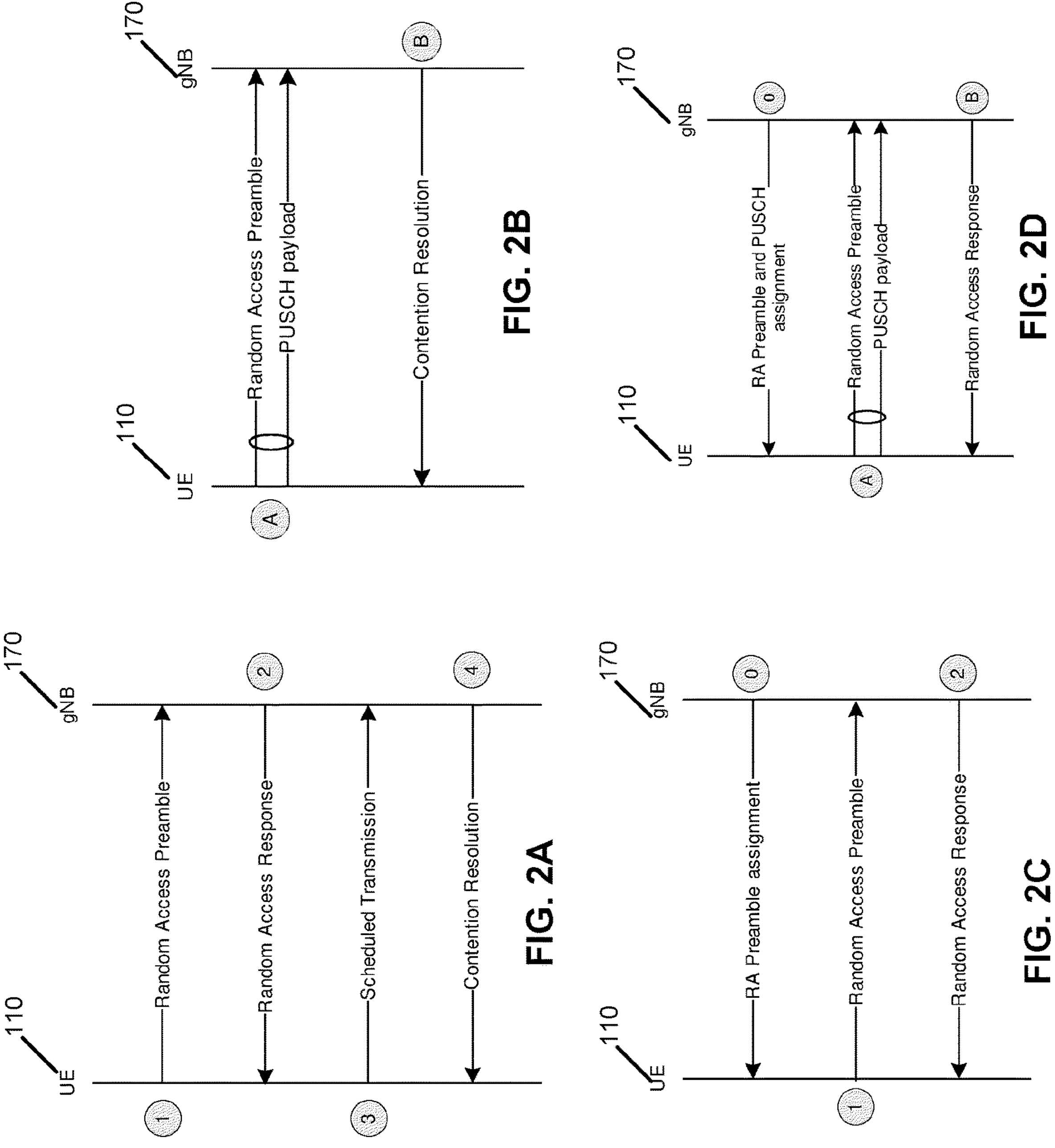
FIG. 2A-2D (reference.

As described in TS 38.300 (see, e.g., 3GPP TS 38.300 V16.3.0 (2020-09)), section 9.2.6), there are two types of random-access (RA) procedures: a 4-step RA type with MSG1 and a 2-step RA type with MSGA. Both types of RA procedure support contention-based random access (CBRA) and contention-free random access (CFRA). FIGS. 2A-2D illustrate various RA procedures, where FIG. 2A illustrates a CBRA with 4-step RA type, FIG. 2B illustrates CBRA with 2-step RA type, FIG. 2C illustrates CFRA with 4-step RA type, and FIG. 2D illustrates CFRA with 2-step RA type.

The UE selects the type of random access at initiation of the random-access procedure based on network configuration, which can be realized either by common or dedicated signaling.

The MSG1 of the 4-step RA type (see FIG. 2A) includes a preamble on PRACH, see step 1. After MSG1 transmission, the UE monitors for a response from the network within a configured window. The gNB 170 responds in step 2 with an RA response, and the UE 110 in step 3 sends a scheduled transmission. In step 4, the gNB 170 responds with a contention resolution.

For CFRA, a dedicated preamble for MSG1 transmission is assigned by the network (see step 0 of FIG. 2C) and upon receiving random access response from the network, the UE ends the random-access procedure as shown in FIG. 2C.

For CBRA, upon reception of the random-access response, the UE sends (step 3 in FIG. 2A) MSG3 using the UL grant scheduled in the response and monitors contention resolution as shown in FIG. 2A. If contention resolution (step 4 in FIG. 2A) is not successful after MSG3 (re) transmission(s), the UE goes back to MSG1 transmission.

The MSGA of the 2-step RA type (see step A of FIGS. 2B and 2D) includes a preamble on PRACH and a payload on PUSCH. After MSGA transmission, the UE 110 monitors for a response from the network within a configured window. For CFRA, a dedicated preamble and PUSCH resource are configured for MSGA transmission and, upon receiving the network response (see step B of FIG. 2D), the UE ends the random-access procedure as shown in FIG. 4D. For CBRA, if contention resolution (see step B of FIG. 2B) is successful upon receiving the network response, the UE 110 ends the random-access procedure as shown in FIG. 2B.

One issue with these RA procedures is that network slicing mechanisms defined since Rel-15 assume resource isolation support: it should be possible to fully dedicate gNB resources to a certain slice, however how gNB supports resource isolation is implementation-dependent. A gNB, even if managing resources with slice specific policies, cannot steer the UE to certain slice resources, as initial random-access procedures do not distinguish different RACH configurations for different slices. That is, random-access procedures and gNB resources management are slice information agnostic.

3GPP targets slice based RACH configurations, which are currently not defined. Proposed solutions herein (see below) consider different RACH configurations per slice or multiple RACH configurations (for multiple slices).

There are two main issues with different RACH configurations for multiple slices, as described below.

1) One issue is the number of slices to configure. While the network can support a large number of slices (e.g., hundreds), the configuration for RACH that is included in common uplink parameters of a cell in broadcast signaling (e.g., SIB1) cannot support large number of slices simultaneously (e.g., due to overhead and SIB size limitations)

2) Another issue is slice-specific resources congestion. RACH configurations for multiple slices will not serve the purpose (to enable fast cell access) when normal resources are not congested, but slice-specific resources can become loaded, e.g., due to a lack of a mechanism to initiate resource-sharing among slice-specific resources with normal/common resources.

Any method considered previously for slice-specific RACH configurations focused on a potential solution from a user perspective, and Mobile Originated (MO) calls were considered: how to receive and apply different RACH configurations for these? A new problem appears for Mobile Terminated (MT) calls: how to set up and prioritize the random-access resources from the network perspective? UE reachability is managed by the network. The gNB, upon receiving a request for a mobile terminated call, needs to deliver a paging message towards the user, who is a referred to as a subscriber. However, there is no guarantee the paged user will not collide with another (not paged) user due to the random-access nature of the random-access procedure.

The network knows its own policies for managing resources and may wish to steer the user with configuration of different resources (e.g., for a less occupied cell). However, the gNB currently has no signaling capabilities to page the user with different resources. Furthermore, due to the potentially very large number of slices as pointed out above, it is not feasible to indicate the slice for every MT call in the paging record.

By contrast with straightforward solutions to define separate RACH configurations slice by slice, and as an overview, exemplary solutions proposed herein are based on assigning RA priority and/or RA priority classes concepts, e.g., for mobile terminated access attempts. In an exemplary embodiment, RA priority means that there can be different configuration for different UEs for the RA procedure: for instance, normal priority, middle priority, and high priority, each of these with its own resources and/or parameters. Meanwhile, an RA priority class is a more general term, where there can many different classes using different resources and/or parameters. The RA priority can be applied to RA procedures initiated in response to a paging procedure, however, the intention is to introduce the support for RA priority also for initial access. The RA priority classes can be assigned to any access attempt following a paging procedure. Alternatively, or in addition the RA priority classes can be assigned to access categories to enable special priorities for certain access categories. The RA priority classes can be assigned to slices to enable slice specific-access during an RA procedure.

It is proposed in some exemplary embodiments that the gNB may include a RA priority indication or a RA priority class in paging records sent in paging messages to UEs. When the RA is triggered due to a paging (or for other reasons) for the UE, the UE applies the prioritized RA or the RA priority class according to the information received in the paging record.

The RA priority information may comprise an indication to apply a set of parameters to prioritize RA procedure by the UE—the set of parameters can be provided over system information broadcast or configured dedicatedly to the UE. The indication can be an information to apply normal priority, middle priority, or high priority. Alternatively, the indication can be a bitmap implying corresponding to a set of parameters to prioritize RA procedure by the UE. In some examples, there could be separate indication for separate parameters in the paging record. Similarly, the RA priority class indication may comprise an indication to apply a set of parameters for an RA procedure by the UE associated with the RA priority class indicated in the paging record. In some examples, the set of parameters may be provided over system information broadcast or configured dedicatedly to the UE pertaining to different RA priority classes.

Figure 3:
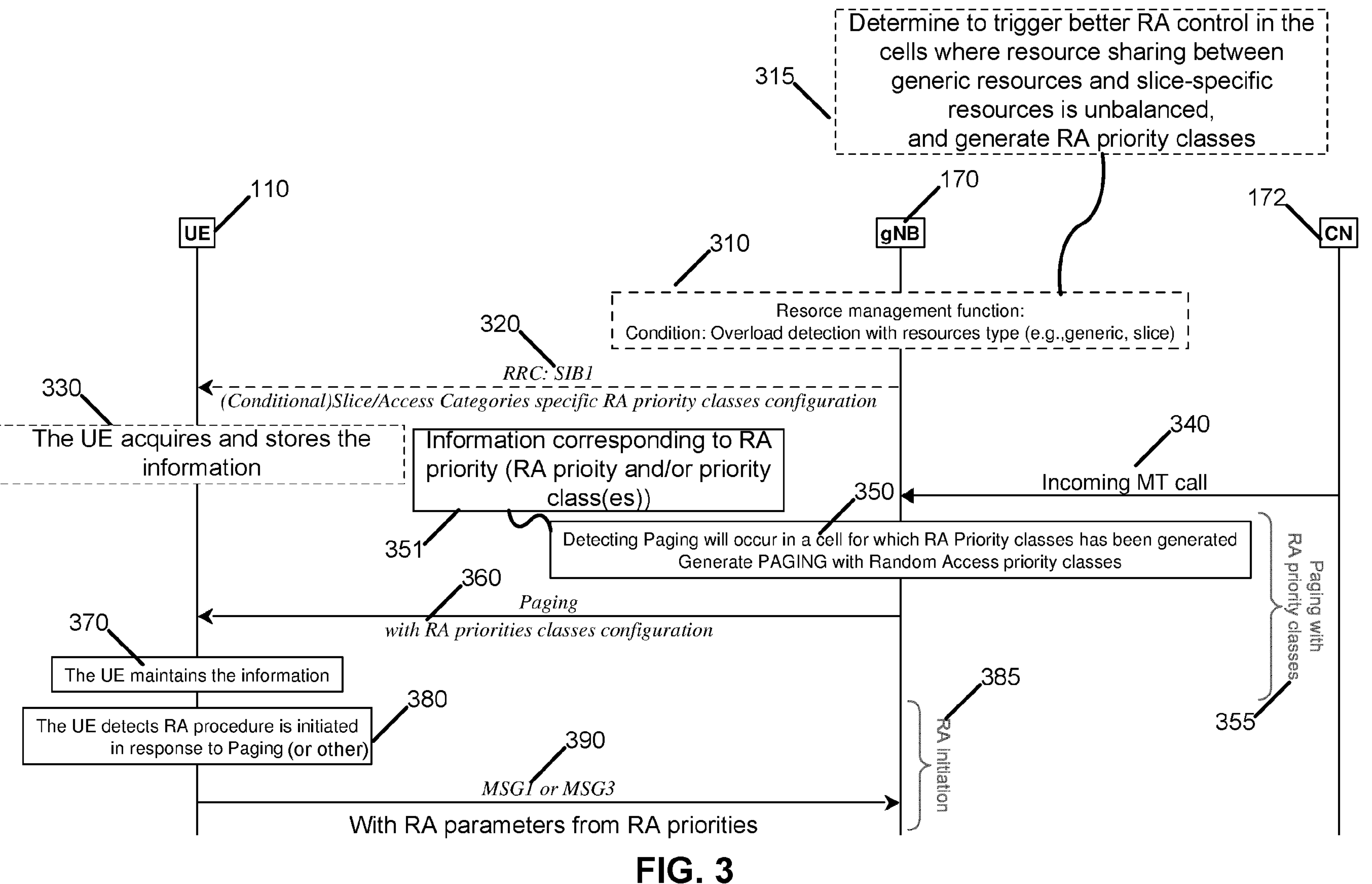
FIG. 3 is a signaling diagram illustrating a procedure for using RA priority for an MT access attempt, in accordance with an exemplary embodiment.

Now that an exemplary overview has been provided, more details are provided. An example implementation is described with reference to FIG. 3, which is a signaling diagram illustrating a procedure for using RA priority for an MT access attempt, in accordance with an exemplary embodiment. FIG. 3 also illustrates the operation of an exemplary method or methods, a result of execution of computer program instructions embodied on a computer readable memory, functions performed by logic implemented in hardware, and/or interconnected means for performing functions in accordance with exemplary embodiments. For the operations in FIG. 3, the UE 110 is assumed to be under control of the control module 140, and the gNB 170 is assumed to be under control of the control module 150, and the corresponding control modules 140/150 contain the circuitry (and possibly computer-readable code executed on the circuitry) and at least some of the means for performing the functions described herein. The dashed lines for blocks 310, 315, 330 and signaling 320 indicate these are optional.

In block 310, the gNB 170 may detect overload on certain resources. This is illustrated by a resource management function, which has a condition of overload detection with resources type (e.g., generic, and/or slice). A generic resource is a resource available to be used by the gNB but is not assigned to a slice.

The overload can be detected on shared/any kind of resources, including the following: i) each UE access attempt may be categorized into a certain access category and access identity contributes to traffic generation; and/or ii) for overload management with random-access priorities, the gNB determines which access categories caused overload. As is known, access categories and access identities are assigned to UEs. An access identity indicates the “categorization” of each single attempt performed by the UE and is specified in 3GPP TS 22.261.

The overload can be detected on slice specific resources. For instance, the gNB may determine overload was caused by a (set of) operator-defined access category(ies) that correspond to slices (e.g., access categories from a 32-63 range have been associated with a S-NSSAI).

In block 315, the gNB 170 determines the need to trigger better random-access control in the cells where resource sharing between generic resources and slice-specific resources is unbalanced. The gNB generates RA priority classes in response, see block 315. Alternatively, a gNB 170 may generate RA priority classes without detecting overload to provide resource isolation by allocating separate parameters to access the gNB for some specific traffic categories. With resource isolation, it can be guaranteed that some resources are exclusively assigned for some specific traffic classes, but no other resources can be used by that specific traffic calls.

The gNB advertises the RA priority classes and related parameters using, in this example, indication of the (e.g., conditional) slice/access categories-specific RA priority class configuration using RRC signaling 320, and in particular via SIB1 in this example. In that case, the UE 110 acquires and stores (e.g., maintains) slice-based configuration with RA priority classes when the UE reads the updated SI. See (block 330). Note that the parameters may comprise one or more of the following: a backoff scaling factor; a power ramping step; a message power offset for group B preambles; or a maximum number of transmission attempts. These are merely exemplary. Additionally, for priority classes and priority in general, these may be configured with separate random-access channel resources, for instance, separate RACH occasions, preambles, or configurations. Such configuration may be indicated (e.g., in signaling such as in signaling 320) by the gNB 170 to the UE 110, for instance.

When a UE needs to be paged by the network for Mobile Terminated (MT) session, see the incoming MT call in signaling 340, in the cell for which RA priority classes has been generated, the gNB detects this (see block 350) and generates (see block 350) a paging message towards the UE that includes, within the paging message, information (see block 351) corresponding to RA priority, such as an indication of RA priority and/or RA priority class. The gNB 170 sends the paging message using signaling 360. Block 350 and signaling 360 are one example of paging with PA priority classes, illustrated in reference 355.

At this point, the UE 110 has maintained (block 370) the information received in block 330. When the UE triggers (block 380) a RA process due to the paging, the UE uses the prioritized RA parameters based on the RA priority indication and/or RA priority class according to the information received in the paging, such as in a paging record. The UE then sends a MSG1 (see FIG. 2A or 2C) or MSG3 (see FIG. 2B or 2D) with RA parameters from RA priorities. This is performed in signaling 390. Note that this is part of an RA procedure. Block 380 and signaling 390 are one potential implementation of the RA initiation 385.

Note that block 380 assumes the RA procedure is initiated in response to reception of the paging from signaling 360. However, the RA procedure could be triggered by a handover or a beam failure recovery procedure, or by any other event that can trigger an RA procedure.

There are multiple options for alerting and configuration a UE 110 for RA control and corresponding actions. In the example of FIG. 3, the actual parameter configuration can be in the system information, e.g., in signaling 320. The parameter configuration includes, e.g., the value of any parameter to be applied by the UE. Meanwhile, the paging, described in block 350 and signaling 360, may indicate just the parameter(s) which can apply the prioritized configuration. Other options are possible, such as having both the indication of the parameter(s) which can apply the prioritized configuration and the corresponding configuration be in the paging.

Figure 4:
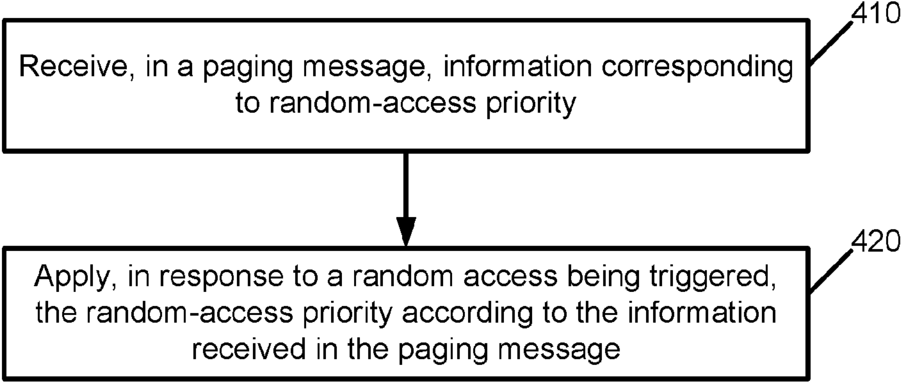
FIG. 4 is a logic flow diagram performed by a user equipment for prioritizing random access procedures for mobile terminated access attempts, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 4, this figure is a logic flow diagram performed by a user equipment for prioritizing random access procedures for mobile terminated access attempts.

This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 4 and the examples below are assumed to be performed by the UE 110 under control of the control module 140.

In block 410, the UE 110 receives, in a paging message, information corresponding to random-access priority. In block 420, the UE 110 applies, in response to a random access being triggered, the random-access priority according to the information received in the paging message.

The following are additional examples. The method in FIG. 4 is referred to as example 1 below.

Example 2. The method of example 1, wherein the information corresponding to the random-access priority comprises one of an indication of a random-access priority or an indication of a random-access priority class.

Example 3. The method of example 2, wherein the indication of the random-access priority comprises an indication to apply a set of parameters for a random-access procedure to be used by the user equipment.

Example 4. The method of example 3, wherein the parameters comprise one or more of the following: a backoff scaling factor; a power ramping step; a message power offset for group B preambles; or a maximum number of transmission attempts.

Example 5. The method of either example 3 or 4, wherein the set of parameters are received over system information but are applied by the user equipment based on reception of the information corresponding to the random-access priority.

Example 6. The method of any one of examples 3 to 5, wherein applying by the user equipment the random-access priority according to the information received in the paging message comprises applying random-access channel resources comprising one or more of random-access channel occasions, random-access channel preambles, or random-access channel configurations corresponding to the random-access priority.

Example 7. The method of example 2, wherein: the random-access priority class is one of multiple random-access priority classes that are assigned to certain access categories to enable special priorities for the certain access categories; and the applying by the user equipment the random-access priority according to the information received in the paging message comprises performing at least part of a random-access procedure using a selected one of the random-access priority classes.

Example 8. The method of example 7, wherein the random-access priority class indication comprises an indication to apply a set of parameters for the random-access procedure associated with the selected random-access priority class.

Example 9. The method of example 8, wherein the parameters comprise one or more of the following: a backoff scaling factor; a power ramping step; a message power offset for group B preambles; or a maximum number of transmission attempts.

Example 10. The method of either example 8 or 9, wherein the set of parameters are received over system information but are applied by the user equipment based on reception of the information corresponding to the selected random-access priority class, which is indicated in the paging message and selected based on the indication in the paging message.

Example 11. The method of any one of examples 7 to 10, wherein applying by the user equipment the random-access priority according to the information received in the paging message comprises applying random-access channel resources comprising one or more of random-access channel occasions, random-access channel preambles, or random-access channel configurations corresponding to the selected random-access priority class.

Example 12. The method of any one of examples 1 to 11, wherein the information corresponding to random-access priority is in one or more paging records of the paging message.

Figure 5:
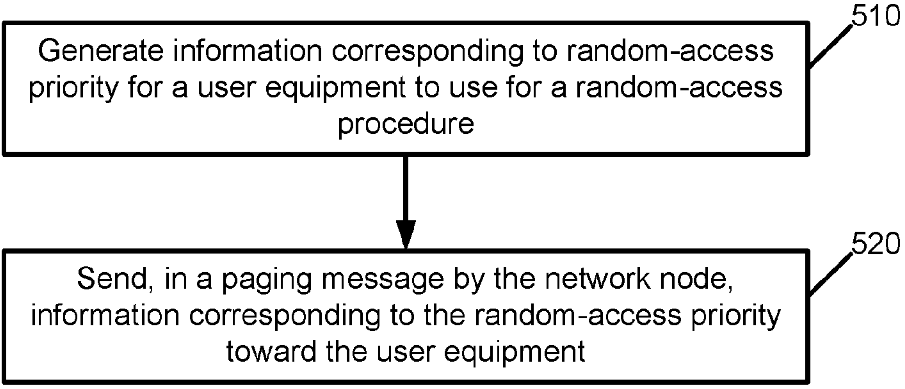
FIG. 5 is a logic flow diagram performed by a network node for prioritizing random access procedures for mobile terminated access attempts, and illustrates the operation of an exemplary method or methods, a result of execution of computer program instructions embodied on a computer readable memory, functions performed by logic implemented in hardware, and/or interconnected means for performing functions in accordance with exemplary embodiments.

Referring to FIG. 5, this figure is a logic flow diagram performed by a network node for prioritizing random access procedures for mobile terminated access attempts. FIG. 5 also illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 4 and the examples below are assumed to be performed by a network node, such as a gNB 170, under control of the control module 150.

In FIG. 15, the network node generates information corresponding to random-access priority for a user equipment to use for a random-access procedure. See block 510. In block 520, the network node sends, in a paging message, information corresponding to the random-access priority toward the user equipment.

The following are additional examples. The method in FIG. 5 is referred to as example 13 below.

Example 14. The method of example 13, wherein: the method further comprises determining by the network node to trigger better random-access control; and the generating the information corresponding to the random-access priority for the user equipment to use for the random-access procedure is performed in response to a determination by the network node to trigger better random-access control.

Example 15. The method of example 14, wherein the determining is made by the network node to trigger better random-access control in response to resource sharing between generic resources and slice-specific resources being unbalanced in one or more cells, and the generating and sending are performed for those one or more cells.

Example 16. The method of any one of examples 13 to 15, wherein the sending in the paging message the information corresponding to the random-access priority is performed in response to reception by the network node of an incoming mobile-terminated call for the user equipment.

Example 17. The method of any one of examples 13 to 16, wherein the information corresponding to the random-access priority comprises one of an indication of a random-access priority or an indication of a random-access priority class.

Example 18. The method of example 17, wherein the indication of the random-access priority comprises an indication for the user equipment to apply a set of parameters for a random-access procedure to be used by the user equipment.

Example 19. The method of example 18, wherein the parameters comprise one or more of the following: a backoff scaling factor; a power ramping step; a message power offset for group B preambles; or a maximum number of transmission attempts.

Example 20. The method of either example 18 or 19, further comprising the network node sending the set of parameters over system information toward the user equipment for application by the user equipment based on reception of the information corresponding to the random-access priority.

Example 21. The method of any one of examples 18 to 20, further comprising the network node indicating to the user equipment one or more of random-access channel occasions, random-access channel preambles, or random-access channel configurations corresponding to the random-access priority.

Example 22. The method of any one of examples 13 to 16, wherein: the random-access priority class is one of multiple random-access priority classes that are assigned to certain access categories to enable special priorities for the certain access categories; and the network node indicates in the random-access priority class indication to the user equipment one of the multiple random-access priority classes to use as a selected random-access priority class.

Example 23. The method of example 22, wherein the random-access priority class indication comprises an indication for the user equipment to apply a set of parameters for the random-access procedure associated with the selected random-access priority class.

Example 24. The method of example 23, wherein the parameters comprise one or more of the following: a backoff scaling factor; a power ramping step; a message power offset for group B preambles; or a maximum number of transmission attempts.

Example 25. The method of either example 23 or 24, further comprising the network node sending the set of parameters over system information toward the user equipment for application by the user equipment based on reception of the information corresponding to the random-access priority.

Example 26. The method of any one of examples 22 to 25, further comprising the network node indicating to the user equipment one or more of random-access channel occasions, random-access channel preambles, or random-access channel configurations corresponding to the random-access priority.

Example 27. The method of any one of examples 13 to 26, wherein the information corresponding to random-access priority is in one or more paging records of the paging message.

Example 28. A computer program, comprising code for performing the methods of any of examples 1 to 27, when the computer program is run on a computer.

Example 29. The computer program according to example 28, wherein the computer program is a computer program product comprising a computer-readable medium bearing computer program code embodied therein for use with the computer.

Example 30. The computer program according to example 28, wherein the computer program is directly loadable into an internal memory of the computer.

Example 31. An apparatus, comprising means for performing:

receiving, in a paging message by a user equipment, information corresponding to random-access priority; and in response to a random access being triggered, applying by the user equipment the random-access priority according to the information received in the paging message.

Example 32. The apparatus of example 31, wherein the information corresponding to the random-access priority comprises one of an indication of a random-access priority or an indication of a random-access priority class.

Example 33. The apparatus of example 32, wherein the indication of the random-access priority comprises an indication to apply a set of parameters for a random-access procedure to be used by the user equipment.

Example 34. The apparatus of example 33, wherein the parameters comprise one or more of the following: a backoff scaling factor; a power ramping step; a message power offset for group B preambles; or a maximum number of transmission attempts.

Example 35. The apparatus of either example 33 or 34, wherein the set of parameters are received over system information but are applied by the user equipment based on reception of the information corresponding to the random-access priority.

Example 36. The apparatus of any one of examples 33 to 35, wherein applying by the user equipment the random-access priority according to the information received in the paging message comprises applying random-access channel resources comprising one or more of random-access channel occasions, random-access channel preambles, or random-access channel configurations corresponding to the random-access priority.

Example 37. The apparatus of example 32, wherein:

the random-access priority class is one of multiple random-access priority classes that are assigned to certain access categories to enable special priorities for the certain access categories; and the applying by the user equipment the random-access priority according to the information received in the paging message comprises performing at least part of a random-access procedure using a selected one of the random-access priority classes.

Example 38. The apparatus of example 37, wherein the random-access priority class indication comprises an indication to apply a set of parameters for the random-access procedure associated with the selected random-access priority class.

Example 39. The apparatus of example 38, wherein the parameters comprise one or more of the following: a backoff scaling factor; a power ramping step; a message power offset for group B preambles; or a maximum number of transmission attempts.

Example 40. The apparatus of either example 38 or 39, wherein the set of parameters are received over system information but are applied by the user equipment based on reception of the information corresponding to the selected random-access priority class, which is indicated in the paging message and selected based on the indication in the paging message.

Example 41. The apparatus of any one of examples 37 to 40, wherein applying by the user equipment the random-access priority according to the information received in the paging message comprises applying random-access channel resources comprising one or more of random-access channel occasions, random-access channel preambles, or random-access channel configurations corresponding to the selected random-access priority class.

Example 42. The apparatus of any one of examples 31 to 10, wherein the information corresponding to random-access priority is in one or more paging records of the paging message.

Example 43. An apparatus, comprising means for performing:

generating, by a network node in a wireless network, information corresponding to random-access priority for a user equipment to use for a random-access procedure; and sending, in a paging message by the network node, information corresponding to the random-access priority toward the user equipment.

Example 44. The apparatus of example 43, wherein:

the apparatus further comprises means for determining by the network node to trigger better random-access control; and the generating the information corresponding to the random-access priority for the user equipment to use for the random-access procedure is performed in response to a determination by the network node to trigger better random-access control.

Example 45. The apparatus of example 44, wherein the determining is made by the network node to trigger better random-access control in response to resource sharing between generic resources and slice-specific resources being unbalanced in one or more cells, and the generating and sending are performed for those one or more cells.

Example 46. The apparatus of any one of examples 43 to 45, wherein the sending in the paging message the information corresponding to the random-access priority is performed in response to reception by the network node of an incoming mobile-terminated call for the user equipment.

Example 47. The apparatus of any one of examples 43 to 46, wherein the information corresponding to the random-access priority comprises one of an indication of a random-access priority or an indication of a random-access priority class.

Example 48. The apparatus of example 47, wherein the indication of the random-access priority comprises an indication for the user equipment to apply a set of parameters for a random-access procedure to be used by the user equipment.

Example 49. The apparatus of example 48, wherein the parameters comprise one or more of the following: a backoff scaling factor; a power ramping step; a message power offset for group B preambles; or a maximum number of transmission attempts.

Example 50. The apparatus of either example 48 or 49, further comprising means for sending by the network node the set of parameters over system information toward the user equipment for application by the user equipment based on reception of the information corresponding to the random-access priority.

Example 51. The apparatus of any one of examples 48 to 50, further comprising means for indicating by the network node to the user equipment one or more of random-access channel occasions, random-access channel preambles, or random-access channel configurations corresponding to the random-access priority.

Example 52. The apparatus of any one of examples 43 to 46, wherein:

the random-access priority class is one of multiple random-access priority classes that are assigned to certain access categories to enable special priorities for the certain access categories; and the network node indicates in the random-access priority class indication to the user equipment one of the multiple random-access priority classes to use as a selected random-access priority class.

Example 53. The apparatus of example 52, wherein the random-access priority class indication comprises an indication for the user equipment to apply a set of parameters for the random-access procedure associated with the selected random-access priority class.

Example 54. The apparatus of example 53, wherein the parameters comprise one or more of the following: a backoff scaling factor; a power ramping step; a message power offset for group B preambles; or a maximum number of transmission attempts.

Example 55. The apparatus of either example 53 or 54, further comprising means for sending by the network node the set of parameters over system information toward the user equipment for application by the user equipment based on reception of the information corresponding to the random-access priority.

Example 56. The apparatus of any one of examples 52 to 55, further comprising means for indicating by the network node to the user equipment one or more of random-access channel occasions, random-access channel preambles, or random-access channel configurations corresponding to the random-access priority.

Example 57. The apparatus of any one of examples 43 to 56, wherein the information corresponding to random-access priority is in one or more paging records of the paging message.

Example 58. The apparatus of any one of examples 31 to 57, wherein the means comprises:

at least one processor; and at least one memory including computer program code, the at least one memory and computer program code configured to, with the at least one processor, cause the performance of the apparatus Example 59. An apparatus, comprising:

one or more processors; and one or more memories including computer program code, wherein the one or more memories and the computer program code are configured, with the one or more processors, to cause the apparatus to perform operations comprising:

receiving, in a paging message by a user equipment, information corresponding to random-access priority; and in response to a random access being triggered, applying by the user equipment the random-access priority according to the information received in the paging message.

Another example is the example of 59, wherein the one or more memories and the computer program code are further configured, with the one or more processors, to cause the apparatus to perform operations in the methods of any of examples 2 to 12.

Example 60. An apparatus, comprising:

one or more processors; and one or more memories including computer program code, wherein the one or more memories and the computer program code are configured, with the one or more processors, to cause the apparatus to perform operations comprising:

generating, by a network node in a wireless network, information corresponding to random-access priority for a user equipment to use for a random-access procedure; and sending, in a paging message by the network node, information corresponding to the random-access priority toward the user equipment.

Another example is the example of 60, wherein the one or more memories and the computer program code are further configured, with the one or more processors, to cause the apparatus to perform operations in the methods of any of examples 14 to 27.

Without in any way limiting the scope, interpretation, or application of the examples appearing below, a technical effect and advantage of one or more of the example embodiments disclosed herein is the paging with random-access priorities enables more efficient use of RA resources as well as reduces the chances of collision for a UE that is paged by the network.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AMF access and mobility management function
CBRA contention-based random access
CFRA contention-free random access
CN core network
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
IE information element
I/F interface
LTE long term evolution
MAC medium access control
MME mobility management entity
MO mobile-originated
MT mobile-terminated
ng or NG next generation
ng-eNB or NG-eNB next generation eNB
NG-RAN next generation RAN
NR new radio
N/W or NW network
OAM operations and maintenance
PDCP packet data convergence protocol
PDU protocol data unit
PLMN Public Land Mobile Network
PHY physical layer
PRACH physical random-access channel
RA random access
RAN radio access network
RAR Random Access Response
Rel release
RLC radio link control
RRH remote radio head
RRC radio resource control
RRM Radio Resource Management
RU radio unit Rx receiver
SDAP service data adaptation protocol
SGW serving gateway
SLA service level agreement
SMF session management function
S-NSSAI Single-Network Slice Selection Assistance Information
TS technical specification
Tx transmitter
UE user equipment (e.g., a wireless, typically mobile device)
UPF user plane function

What is claimed is:

1. A method, comprising:
determining, by a network node in a wireless network, to trigger prioritized random-access control in one or more cells of the network node in response to resource sharing between generic resources and slice-specific resources being unbalanced in the one or more cells;
in response to the determining, generating, with the network node, information corresponding to a random-access priority for a user equipment to use for a random-access procedure; and
sending, in a paging message with the network node, the information corresponding to the random-access priority to the user equipment within the one or more cells.

2. The method of claim 1, wherein the sending, in the paging message, the information corresponding to the random-access priority is performed in response to reception, with the network node, of an incoming mobile-terminated call for the user equipment.

3. The method of claim 1, wherein the information corresponding to the random-access priority comprises one of an indication of the random-access priority or an indication of a random-access priority class.

4. The method of claim 3, wherein the indication of the random-access priority comprises an indication for the user equipment to apply a set of parameters for the random-access procedure to be used with the user equipment.

5. The method of claim 4, wherein the parameters comprise one or more of the following: a backoff scaling factor, a power ramping step, a message power offset for group B preambles, or a maximum number of transmission attempts.

6. The method of claim 4, further comprising the network node sending the set of parameters over system information to the user equipment for application with the user equipment based on reception of the information corresponding to the random-access priority.

7. The method of claim 4, further comprising the network node indicating to the user equipment one or more of random-access channel occasions, random-access channel preambles, or random-access channel configurations corresponding to the random-access priority.

8. The method of claim 3, wherein the information corresponding to the random-access priority comprises the indication of the random-access priority class, and wherein:
the random-access priority class is one of multiple random-access priority classes that are assigned to one or more access categories to enable priorities for the one or more access categories; and
the network node indicates in the random-access priority class indication to the user equipment one of the multiple random-access priority classes to use as a selected random-access priority class.

9. The method of claim 8, wherein the indication of the random-access priority class comprises an indication for the user equipment to apply a set of parameters for the random-access procedure associated with the selected random-access priority class.

10. The method of claim 9, wherein the set of parameters comprises one or more of the following: a backoff scaling factor, a power ramping step, a message power offset for group B preambles, or a maximum number of transmission attempts.

11. The method of claim 9, further comprising the network node sending the set of parameters over system information to the user equipment for application with the user equipment based on reception of the information corresponding to the random-access priority.

12. The method of claim 8, further comprising the network node indicating to the user equipment one or more of random-access channel occasions, random-access channel preambles, or random-access channel configurations corresponding to the selected random-access priority class.

13. The method of claim 1, wherein the information corresponding to random-access priority is in one or more paging records of the paging message.

14. A non-transitory program storage device readable with an apparatus, tangibly embodying a program of instructions executable with the apparatus for performing the method of claim 1.

15. An apparatus, comprising:
at least one processor; and
at least one non-transitory memory storing instructions that, when executed with the at least one processor, cause the apparatus to perform:
determining, by a network node in a wireless network, to trigger prioritized random-access control in one or more cells of the network node in response to resource sharing between generic resources and slice-specific resources being unbalanced in the one or more cells;
in response to the determining, generating, with the network node, information corresponding to a random-access priority for a user equipment to use for a random-access procedure; and
sending, in a paging message with the network node, the information corresponding to the random-access priority to the user equipment within the one or more cells.

16. The apparatus of claim 15, wherein the instructions, when executed with the at least one processor, cause the apparatus to perform the sending, in the paging message, the information corresponding to the random-access priority in response to reception, with the network node, of an incoming mobile-terminated call for the user equipment.

17. The apparatus of claim 15, wherein the information corresponding to the random-access priority comprises one of an indication of the random-access priority or an indication of a random-access priority class.

18. The apparatus of claim 17, wherein the indication of the random-access priority comprises an indication for the user equipment to apply a set of parameters for the random-access procedure to be used with the user equipment.

19. The apparatus of claim 18, wherein the parameters comprise one or more of the following: a backoff scaling factor, a power ramping step, a message power offset for group B preambles, or a maximum number of transmission attempts.

20. The apparatus of claim 18, wherein the instructions, when executed with the at least one processor, cause the apparatus to perform sending, with the network node, the set of parameters over system information to the user equipment for application with the user equipment based on reception of the information corresponding to the random-access priority.

21. The apparatus of claim 18, wherein the instructions, when executed with the at least one processor, cause the apparatus to perform indicating, with the network node to the user equipment, one or more of random-access channel occasions, random-access channel preambles, or random-access channel configurations corresponding to the random-access priority.

22. The apparatus of claim 17, wherein the information corresponding to the random-access priority comprises the indication of the random-access priority class, and wherein:

the random-access priority class is one of multiple random-access priority classes that are assigned to one or more access categories to enable priorities for the one or more access categories; and the network node indicates in the random-access priority class indication to the user equipment one of the multiple random-access priority classes to use as a selected random-access priority class.

23. The apparatus of claim 22, wherein the indication of the random-access priority class comprises an indication for the user equipment to apply a set of parameters for the random-access procedure associated with the selected random-access priority class.

24. The apparatus of claim 23, wherein the set of parameters comprises one or more of the following: a backoff scaling factor, a power ramping step, a message power offset for group B preambles, or a maximum number of transmission attempts.

25. The apparatus of claim 23, wherein the instructions, when executed with the at least one processor, cause the apparatus to perform sending, with the network node, the set of parameters over system information to the user equipment for application with the user equipment based on reception of the information corresponding to the random-access priority.

26. The apparatus of claim 22, wherein the instructions, when executed with the at least one processor, cause the apparatus to perform indicating, with the network node to the user equipment, one or more of random-access channel occasions, random-access channel preambles, or random-access channel configurations corresponding to the selected random-access priority class.

27. The apparatus of claim 15, wherein the information corresponding to random-access priority is in one or more paging records of the paging message.

* * * * *